July 2, 1929. G. C. PEARSON 1,719,079
TOOL RETAINER
Filed Jan. 7, 1927  2 Sheets-Sheet 1
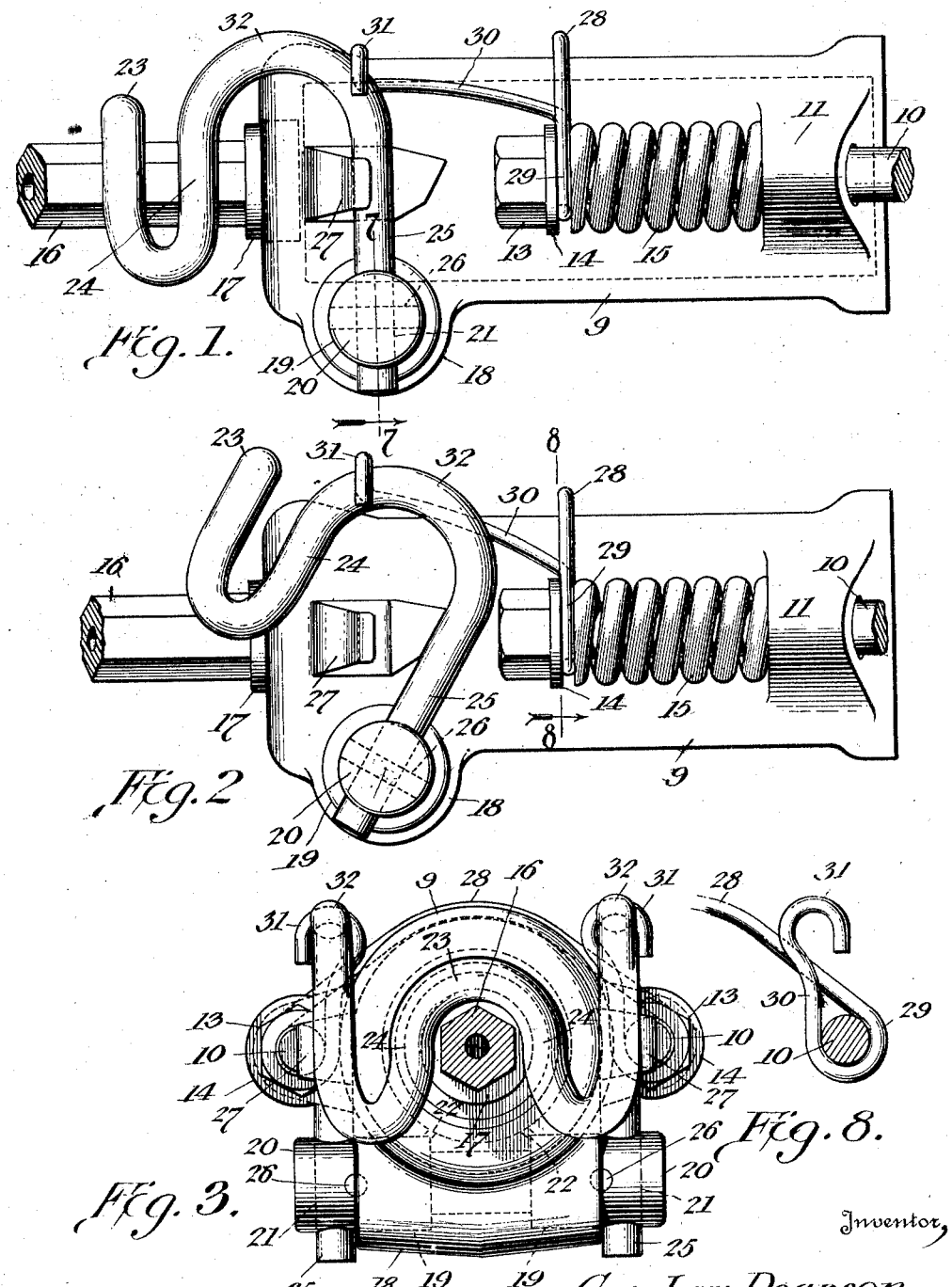
Inventor,
Gustav Pearson.
By
Attorney July 2, 1929. G. C. PEARSON 1,719,079
TOOL RETAINER
Filed Jan. 7, 1927 2 Sheets-Sheet 2

Inventor,
Gustav Pearson.
By
Attorney

Patented July 2, 1929.

1,719,079

UNITED STATES PATENT OFFICE.

GUSTAV C. PEARSON, OF DENVER, COLORADO, ASSIGNOR, BY MESNE ASSIGNMENTS, TO THE GARDNER-DENVER COMPANY, OF QUINCY, ILLINOIS, A CORPORATION OF DELAWARE.

TOOL RETAINER.

Application filed January 7, 1927. Serial No. 159,703.

The present invention relates to tool retainers and while especially designed for rock drills, may obviously be used for other purposes of an analogous character.

The object is to provide a tool retaining device of relatively simple structure, and of novel character that will effectively retain a tool in its socket and yet allow it to have sufficient play for operating purposes, will have sufficient resiliency to prevent its being broken if struck by the tool, and is readily movable between an operative and an inoperative position, novel means being provided for holding it in such positions.

Figure 4:
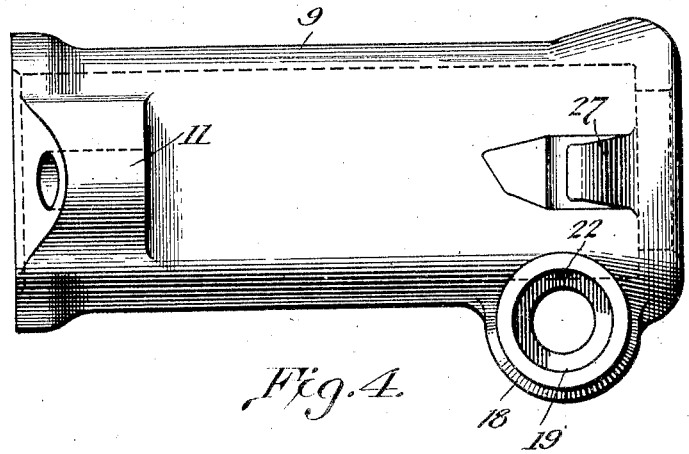
Figure 5:
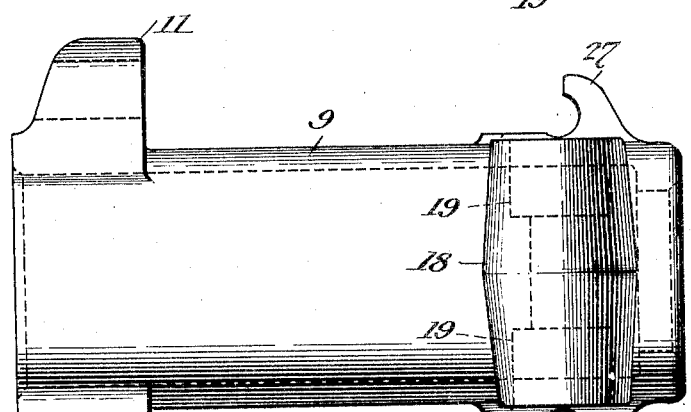
Figures 6, 7:
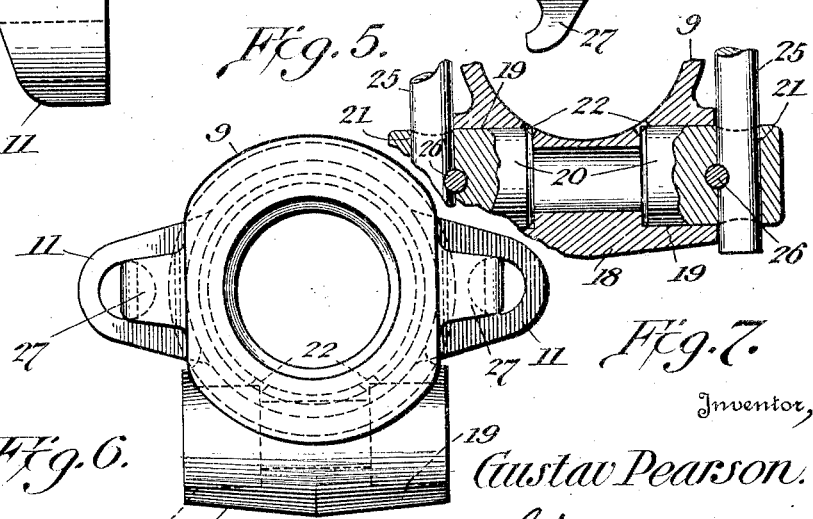

In the accompanying drawings:

Figure 1 is a side elevation of the chuck head for rock drills equipped with the novel tool steel retainer, and showing the same in its operative position, Figure 2 is a similar view showing a tool with the retainer in its inoperative position, Figure 3 is a front elevation of the same, Figure 4 is a side elevation of the chuck head, with the retainer removed and showing the parts of said head that cooperate with said retainer, Figure 5 is a top plan view of the head shown in Figure 4, Figure 6 is a front elevation of said head, Figure 7 is a sectional view on the line 7—7 of Figure 1, Figure 8 is a detail sectional view on the line 8—8 of Figure 2.

The chuck head, designated 9, may be of any well-known character and is attached to the body of the drill in the usual manner by side bolts 10 passing through ears 11 formed on opposite sides of the rear end of said head. These side bolts have holding nuts 13 on their front ends backed by washers 14 and interposed between the washers 14 and the ears 11 are springs 15. The head is provided with the usual socket for the reception of the tool, in the present embodiment a drill steel, a portion of which is shown at 16, this steel having a collar 17.

The head 9 is provided at its front end and at one side of the tool receiving socket with a transversely disposed, preferably integral journal box 18, having enlarged sockets 19 at its ends. In these sockets are journaled trunnions 20 that have their outer ends projecting beyond the ends of the journal box, said projecting ends being provided with transverse openings 21 therethrough. In order to lubricate the journal bearings in said trunnions, ports 22 open from the front end of the head into the sockets and serve to convey lubricant supplied to the chuck to said journal bearings.

A tool retaining yoke is employed, comprising a central bight 23 and side arms 24 that are reversely curved or are of serpentine form. These side arms terminate in substantially straight portions 25 that embrace the chuck head 9 and are disposed transversely thereto, the ends of the straight portions passing through the openings 21 in the projecting ends of the trunnions and being pinned therein, as shown at 26. Stop lugs 27 are formed on opposite sides of the chuck head 9, and are preferably of hook formation, as illustrated in Figure 5, these stop lugs being disposed in the path of the straight portions 25 of the side arms, thus limiting their forward swinging movement and consequently the transverse movement of the bight 23 of the yoke, as shown in Figure 1. When in this position the bight of said yoke is in advance of the collar 17 of the drill steel 16, and the diameter of said collar being greater than the space within the bight 23 of the yoke, said bight will constitute a stop for preventing the detachment of the steel from the chuck.

In order to hold the yoke in its above operative position, as shown in Figure 1, or in its inoperative position as shown in Figure 2 a spring is employed, comprising a saddle portion 28 that partly encircles the head 9 and has eyes 29 surrounding the side bolts 10 and interposed between the washers 14 and springs 15. This spring has end fingers 30 that extend forwardly and terminate in lateral hooks 31 that ride on the curved portions 32 of the side arms of the yoke. The arrangement is such that when the yoke is in its operation position, as shown in Figure 1, the hooks 31 will be behind the curved portion and thus serve to hold the yoke forwardly with the portions 25 against the stop lugs 27. If sufficient pressure is brought to bear upon the yoke, obviously it can be swung laterally and rearwardly, the hooks 31 riding over the curved portions 32 of the side arms to positions sufficiently in advance of the highest portions of the curves so as to hold the yoke in its inoperative position as will be evident by reference to Figure 2.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim is:

1. The combination with a tool holding device, of trunnion means journaled thereon and having projecting ends provided with openings, and a tool retaining yoke having side arms of substantially serpentine form and having their free ends secured in the openings of the trunnion means.

2. The combination with a tool holding head having a tool receiving socket, of a tool retaining yoke having side arms that embrace the head and have terminal portions disposed transversely thereto on opposite sides thereof and pivotally mounted on said head, and stops carried by the head in front of and in the paths of the said transversely disposed terminal portions to be engaged thereby on their forward movements.

3. The combination with a chuck head having a tool receiving socket and a journal box at one side of the socket and transversely thereto, of trunnions journaled in the box and projecting beyond the ends thereof, a tool retaining yoke having a bight that lies transversely to the socket in advance of the head and substantially S-shaped side arms having terminal portions embracing the head and disposed transversely thereto on opposite sides thereof, the ends of said arms being fastened in the projecting portions of the trunnions, and stop lugs on opposite sides of the head in front of the transversely disposed terminal portions of the side arms and engaged thereby on the forward swinging movement.

4. The combination with a tool holding head, of a tool retaining yoke having side arms pivotally mounted on the head, and a spring for holding the yoke in a predetermined position, said spring having a sliding bearing on a side arm between the yoke and the pivotal mounting.

5. The combination with a tool holding head, of a tool retaining yoke having side arms pivotally mounted on opposite sides of the head, and a spring for holding the yoke in a predetermined position, said spring being mounted on the head and having spaced fingers slidably bearing respectively on the arms of the yoke.

6. The combination with a tool holding head, of a tool retaining yoke having side arms pivotally mounted on the head, and a spring having an intermediate saddle portion mounted transversely on the head and having terminal fingers slidably bearing on the yoke arms.

7. The combination with a chuck head, of a swinging tool retaining yoke having curved side arms pivotally mounted on the head, and a spring having an intermediate portion mounted on the head and terminal fingers slidably bearing respectively on the curved portions of the side arms.

8. The combination with a chuck head, of a swinging tool retaining yoke having curved side arms pivotally mounted at their free ends on one side of the head and having their curved portions at the opposite side of the head, and a spring mounted on the head and having portions slidably borne against by the curved portions of both arms.

9. The combination with a chuck head having a tool receiving socket opening through one end and having a transverse journal box at one side, of a tool retaining yoke having a bight in advance of the head and having spaced side arms of substantially S-shape trunnioned in the journal box, side bolts for the chuck head, and a spring having eyes on the bolts and a saddle portion over the chuck head, said spring having terminal fingers slidably engaged with curved portions of the side arms.

10. The combination with a tool holding device, of trunnion means journaled therein and having projecting ends provided with openings, and a tool retaining yoke having side arms fixed in the openings of the trunnion means.

11. The combination with a tool holding head, of a tool retainer comprising substantially S-shaped side arms located in planes disposed substantially longitudinally of and on opposite sides of the head, the rear terminal portions of said side arms being disposed transversely of and on opposite sides of the head and pivotally mounted thereon, and a tool engaging bight connecting the front ends of the side arms in advance of the head, and abutments against which the transverse portions of the side arms abut.

12. The combination with a tool holding head, of a tool retainer comprising substantially S-shaped side arms located in planes disposed substantially longitudinally of and on opposite sides of the head, the rear terminal portions of said side arms being disposed transversely of and on the opposite sides of the head, trunnion means journaled on the head and having the transversely disposed rear ends of the side arms secured thereto, and a tool engaging bight connecting the front ends of the side arms in advance of the head, and abutments against which the transverse portions of the side arms abut.

13. The combination with a tool holder, of a tool retainer including a tool embracing yoke having a side arm pivotally mounted on the holder and having a bowed portion between its pivot mounting and the yoke, and a spring mounted on the holder and slidably engaging the bowed portion of the side arm and movable to opposite sides of said bowed portion to hold the retainer both in an operative and an inoperative position.

14. The combination with a tool holder, of a tool retainer including a tool embracing yoke having rearwardly extending side arms provided with bowed portions, and a spring mounted on the tool holder and having terminal portions that slidably engage respectively the bowed portions of the side arms and being movable to opposite sides of said bowed portion to hold the retainer both in an operative and an inoperative position.

In testimony whereof, I affix my signature.

GUSTAV C. PEARSON.